July 11, 1939.   H. S. COLTON   2,165,344
SOLID MATERIAL FROM WASTE LIQUOR
Filed March 17, 1938
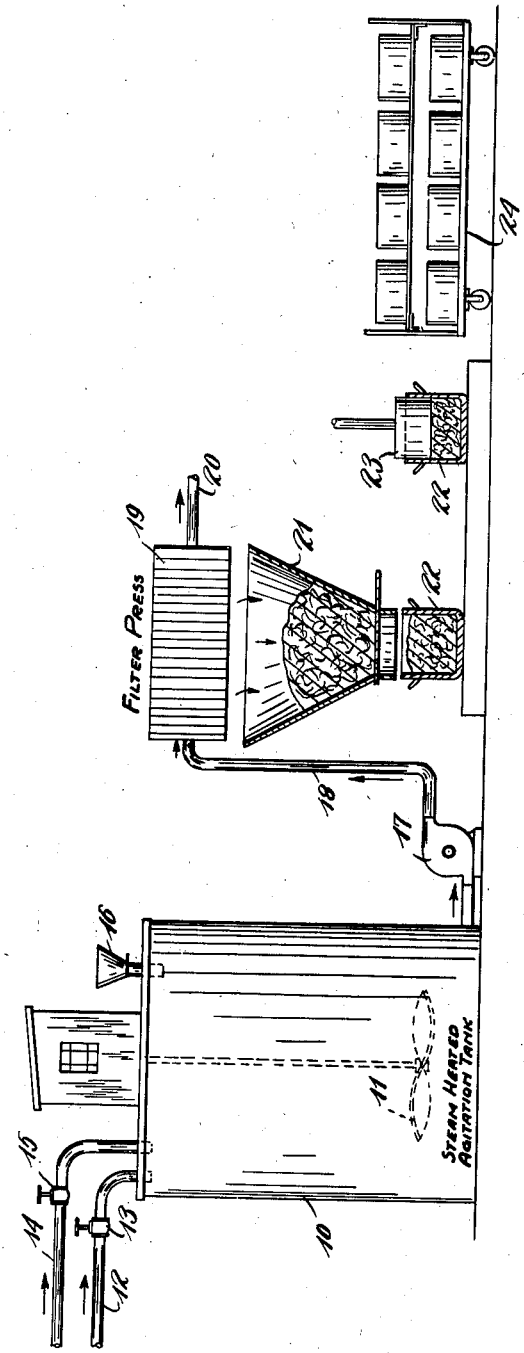
INVENTOR.
HENRY SEYMOUR COLTON
BY
ATTORNEYS Patented July 11, 1939

2,165,344

UNITED STATES PATENT OFFICE 2,165,344

SOLID MATERIAL FROM WASTE LIQUOR

Henry Seymour Colton, Shaker Heights, Ohio, assignor to H. Seymour Colton, M. J. Rentschler, and James A. Weeks, as trustees Application March 17, 1938, Serial No. 196,491

18 Claims. (Cl. 106—27)

The invention relates to a composition of matter and process of producing same from industrial waste liquor, and has reference particularly to the precipitation of useful solid material from waste sulphuric acid pickle liquor containing iron sulphate and free sulphuric acid. Similar results may be attained from a synthetic liquor containing iron sulphate with or without free sulphuric acid, although at greater expense. The invention also has to do with the formation of such material into usable industrial products, especially molded objects and sheets or bars of compacted material.

In the steel mills large quantities of sulphuric acid are used for the pickling of steel products. The spent liquor taken from the pickling vats or pits is highly corrosive due to free sulphuric acid present, and it is otherwise objectionable if dumped into streams because of its considerable content of iron sulphate. The disposal of the waste liquor therefore presents something of a problem. Most efforts to solve the problem heretofore have been directed to merely neutralizing the free acid or to the reclamation of the free acid. Methods and apparatus for the latter purpose are costly, and in addition the problem of disposing of a large amount of sludge still remains.

The present invention utilizes both the sulphuric acid content and the ferrous sulphate content of the spent liquor, and nothing remains except water. An intermediate product of the process is a precipitate which is capable of congealing when pressed and dried, with or without a filler of fibrous or other character, to form various useful articles, amongst which are wall board, pottery and ceramic substitutes, insulation materials, and the like. The precipitate is also capable of treatment in such a way as to form plaster of a novel character. Where molded products are made the process is capable of control to vary the density and hardness of the articles between rather wide limits, so that articles for a large variety of purposes may be produced.

Accordingly, one of the objects of the invention is the utilization of sulphuric acid iron pickle liquor for the production of useful articles of manufacture.

Another object is the provision of a process for converting all of the active constituents of waste pickle liquor into useful materials, thereby eliminating all difficulties in disposing of the pickle liquor.

Another object is the provision in connection with the stated process of a method of controlling the density and hardness of the resulting material.

Other objects and features of novelty will appear as I proceed with the description of the process and the resulting product in connection with apparatus illustrated diagrammatically in the accompanying drawing which shows an elevational view of one form of apparatus which may be employed in connection with the invention.

In carrying out the invention I first dilute the waste pickle liquor, which is essentially sulphuric acid and ferrous sulphate, and then add a quantity of an alkaline calcium compound, such as calcium oxide, calcium hydroxide, or calcium carbonate, and subject the mix to agitation. The quantity of neutralizing material added depends upon the quantity of sulphuric acid and ferrous sulphate present in the waste liquor, and should be sufficient not only to neutralize the sulphuric acid but also to cause precipitation of all of the iron salts in the liquor. The reaction takes place much more readily and completely if it occurs in the presence of heat. I prefer to boil the mixture, but I find that any temperature between 60° C. and 100° C. is fairly satisfactory. It is desirable to maintain a temperature above 60° C. for the reason that at lower temperatures the precipitate becomes more difficult to filter.

The precipitate consists of calcium sulphate and iron hydroxide, the latter principally in the ferrous state. The hydroxide is a colloidal precipitate, and the fact that the two precipitates are thrown down together or formed in situ appears to have an important bearing upon the resulting product. I believe that the fact that the two are coprecipitated and coalesced, or allowed to grow together is very important. This is indicated by the fact that when calcium sulphate and ferrous hydroxide are formed separately and independently and then mixed together the resulting precipitate is distinctly different in character.

The chemical reactions may be written as follows:

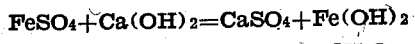

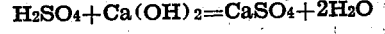

A filler may be added either before or after the calcium compound is mixed with the pickle liquor. Various types of fillers may be used. Fibrous material is desirable for some purposes. Asbestos is useful where resistance to heat is important. Clay, cinders and the like may be employed for other purposes. The quantity of filler may be varied within wide limits. As little as 2% and as much as 25% by weight of the entire mass have been found to be satisfactory.

When the precipitation is complete the magma is put into a filter press and as much as possible of the water is thereby removed. The temperature preferably is maintained above 60° C. during the filtration step also. This leaves a moist cake which is thoroughly plastic and which may be pressed, extruded or molded into wall board, bars, or other articles of any desired shape. For wall board I prefer to use a relatively light weight filler, for example a pulp made from paper. Since material of this kind may advantageously be porous I press it into sheets under relatively light pressure. Also, the pressing is done while the precipitate is still quite moist, and when the moisture is driven off pores are left in the material.

When a relatively dense hard object is to be formed I may use a heavier or denser filler, but the desired result is attained largely by expelling a certain part of the moisture remaining after filtering, for example by partially drying the precipitate, and then pressing or molding under heavy pressure. I have determined through experiment that by the controls indicated I am able to produce materials the density of which varies from one weighing 20 lbs. to the cubic foot to one weighing more than 125 lbs. to the cubic foot. The lighter material is of course not so strong as the heavier material, but is quite satisfactory for wall board, particularly because of its good insulating qualities. The denser material is excellent for molded objects and possesses great strength.

When the material has been formed and compacted it must be dried in order to acquire a set. The final drying step may be carried out at room temperature, or good results are obtained when moderate heat is applied to hasten the drying. The moist cake when first formed is green, but as the drying progresses its color changes to a tan or brown shade due to the oxidation of the ferrous hydroxide. This change seems to have a beneficial effect on the product.

According to one phase of my invention the precipitate as it comes from the filter press is dried quickly and completely by the application of heat and without any compacting. The dried cake is then highly porous, and almost frothy in appearance. It is thereafter pulverized and used as a plaster or as a filler material in rubber, paper or similar technology. When put to use as a plaster it is mixed with water and handled in the ordinary manner of a plaster. It does not set quickly as does plaster of Paris, but requires considerable time to dry thoroughly, indicating that its character is quite different from that of ordinary crystalline sulphate.

Referring now to the drawing, 10 represents a vat equipped with an agitator 11, driven by suitable means not shown. The pickle liquor may be introduced into the vat through a pipe 12 having a shut off valve 13. When it thus enters the vat it may or may not be heated. The alkaline calcium compound is also placed in the vat. Where milk of lime is thus used it may be conducted into the vat through another pipe 14 with a shut off valve 15. Correct proportions may be determined in advance for a given pickle liquor, and measured quantities of the pickle liquor and the calcium compound added. For convenience however I can titrate the acid liquor with the alkaline material using phenolphthalein or other suitable indicator to note the rise in pH when all the iron has been precipitated. Filler material, if used, is also introduced into the vat, as for instance through a hopper 16. It is advisable to do this before precipitation begins.

The vat is heated, preferably by steam coils or by the introduction of jets of steam into the vat to bring the mix up to the desired temperature, and the agitator 11 is operated in order to cause all of the materials to be intimately commingled. When the precipitation is completed a pump 17 is started and caused to deliver the magma through a pipe 18 into a filter press 19 which removes the filtrate and discharges it through a pipe 20. The filtrate, being merely water, may be permitted to flow into a stream without causing any pollution thereof. When a given charge has been treated in this manner, the pump 17 is stopped and the filter cake dumped into a hopper 21 located therebelow. Although it is not entirely essential, I prefer to maintain the temperature of the material in the filter press and in the hopper 21 at not less than 60° C. for reasons heretofore stated.

From this point on the particular treatment given the moist filter cake depends upon the character of the article to be formed. In the drawing I have shown hollow dies or containers 22 which may be placed one at a time under the discharge opening of the hopper 21 to receive a quantity of the moist precipitate. Such die or receptacle may then be moved aside and a plunger 23 caused to enter it. Pressure is then exerted upon the plunger to compact the moist cake to such extent as may be desired. Thereafter the compacted material may be placed on a truck or carriage 24 and moved to a suitable location for drying.

In cases where it is desired to expel more water than can be removed in the filter press the filter cake may be subjected to a preliminary drying action. Such preliminary drying is conducted preferably without permitting the temperature of the precipitate to fall below 60° C. Thereafter the molding and final drying are performed in the regular manner.

Having thus described my invention, I claim:

1. A plastic composition of matter adapted for formation into useful products by molding, extrusion or the like, comprising largely a joint precipitate of calcium sulphate and iron hydroxide.

2. A plastic composition of matter adapted for formation into useful products by molding, extrusion or the like, comprising largely a joint precipitate of calcium sulphate and iron hydroxide in the proportions by weight approximately of 60% calcium sulphate and 40% iron hydroxide.

3. A formed rigid composition of matter, comprising largely a joint precipitate of calcium sulphate and ferric hydroxide, compacted and coalesced by pressure before the final setting thereof.

4. A formed and rigid composition of matter, comprising a joint precipitate of calcium sulphate and iron hydroxide with a commingled filler set therewith by the oxidation of a substantial portion of said hydroxide.

5. A dried precipitate from waste sulphuric acid iron pickle liquor, comprising calcium sulphate and iron hydroxide in the proportions by weight approximately of 60% calcium sulphate and 40% iron hydroxide.

6. A congealed and rigid material in compact dry form, derived from waste sulphuric acid iron pickle liquor, which comprises a joint precipitate of calcium sulphate and iron hydroxide in the proportions by weight approximately of 60% calcium sulphate and 40% iron hydroxide.

7. A congealed and rigid material in compact, dry form derived from waste sulphuric acid iron pickle liquor, comprising calcium sulphate and iron hydroxide in the ratio by weight of approximately three parts of calcium sulphate and two parts of iron hydroxide, together with a commingled filler constituting 2% to 25% by weight of the entire mass.

8. The process of forming a congealed and rigid material from waste sulphuric acid iron pickle liquor, which comprises adding an alkaline calcium compound in proportions sufficient to neutralize the free sulphuric acid and precipitate the iron salts, heating the mix to assist the precipitation of calcium sulphate and iron hydroxide, filtering, compacting the precipitate, and drying in the presence of air.

9. The process of forming a relatively light weight molded material from waste sulphuric acid iron pickle liquor, which comprises adding an alkaline calcium compound in proportions sufficient to neutralize the free sulphuric acid and precipitate the iron salts, heating the mix to assist the precipitation of the material in solution, filtering, molding the precipitate under light pressure while it is still damp, and drying in the presence of air.

10. The process of forming a relatively dense molded material from waste sulphuric acid iron pickle liquor, which comprises adding an alkaline calcium compound in proportions sufficient to neutralize the free sulphuric acid and precipitate the iron salts, heating the mix to assist the precipitation of the material in solution, filtering, expelling free water from the precipitate, molding under heavy pressure, and drying in the presence of air.

11. The process of forming a congealed and rigid material from waste sulphuric acid pickle liquor containing ferrous sulphate, which comprises adding an alkaline calcium compound in proportions sufficient to neutralize the free sulphuric acid and precipitate the iron salts, boiling the mix, filtering off the liquid, expelling a portion of the free water from the precipitate, compacting the partially dried precipitate, and drying the thus compacted material in the presence of air.

12. The process of forming congealed and rigid material from waste sulphuric acid pickle liquor containing ferrous sulphate, which comprises adding milk of lime in proportions sufficient to neutralize the free sulphuric acid and precipitate the iron salts, boiling the mix, filtering off the liquid, expelling at least a portion of the free water from the precipitate, compacting the partially dried precipitate, and drying the thus compacted material in the presence of air.

13. The process of forming congealed and rigid material from waste sulphuric acid pickle liquor containing ferrous sulphate, which comprises adding a finely divided alkaline calcium compound in proportions sufficient to neutralize the free sulphuric acid and precipitate the iron salts, raising the temperature of the mix to at least 60° C., filtering off the liquid, expelling at least a part of the free water from the precipitate, compacting the partially dried precipitate, and completing the drying thereof in the presence of air.

14. The process of forming congealed and rigid material from waste sulphuric acid pickle liquor containing ferrous sulphate, which comprises adding an alkaline calcium compound in proportions sufficient to neutralize the liquor and cause calcium sulphate and colloidal iron hydroxide to be precipitated together, filtering, compacting the precipitate, and drying the same in the presence of air.

15. The process of forming congealed and rigid material from waste sulphuric acid pickle liquor containing ferrous sulphate, which comprises precipitating calcium sulphate and iron hydroxide by means of the addition of an alkaline calcium compound and heat, filtering, pressing the precipitate into the desired form, the temperature of the precipitate before pressing being maintained at not less than 60° C., and drying the pressed material in the presence of air.

16. The process of forming molded material from waste sulphuric acid pickle liquor containing ferrous sulphate, which comprises adding a neutralizing compound of calcium, thereby co-precipitating calcium sulphate and iron hydroxide, filtering off the liquid, applying pressure to the filtered wet cake of precipitate before the mass is set, and drying the pressed material in the presence of air.

17. The process of forming a plastic composition adapted for formation into useful products by molding, extrusion and the like from waste iron pickle liquor which comprises adding an alkaline calcium compound in sufficient quantity to cause the mixture to turn phenolphthalein indicator pink and removing excess water by filtration.

18. A congealed and rigid material in compact dry form derived from waste sulphuric acid iron pickle liquor together with a commingled organic fibrous filler constituting between 1% to 25% by weight of the entire mass.

HENRY SEYMOUR COLTON.